US008549315B2

(12) United States Patent
Read et al.

(10) Patent No.: US 8,549,315 B2
(45) Date of Patent: *Oct. 1, 2013

(54) SYSTEM AND METHOD FOR GENERATING AND MANAGING ADMINISTRATOR PASSWORDS

(75) Inventors: Matthew J. Read, Oakland, CA (US); Craig S. Ames, Laguna Niguel, CA (US); Vinit Nangia, Dix Hills, NY (US); Pavel Lobashov, Brooklyn, NY (US); Josiah Lam, Hong Kong (CN)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,468

(22) Filed: Sep. 14, 2012

(65) Prior Publication Data

US 2013/0019103 A1 Jan. 17, 2013

Related U.S. Application Data

(63) Continuation of application No. 12/360,100, filed on Jan. 26, 2009, now Pat. No. 8,321,682.

(60) Provisional application No. 61/023,347, filed on Jan. 24, 2008.

(51) Int. Cl.
*G06F 21/00* (2013.01)
*H04L 9/00* (2006.01)

(52) U.S. Cl.
USPC ............................................ 713/183; 380/44

(58) Field of Classification Search
None
See application file for complete search history.

(56) References Cited

U.S. PATENT DOCUMENTS 3,705,385 A 12/1972 Batz
3,860,870 A 1/1975 Furuya
(Continued)

FOREIGN PATENT DOCUMENTS

CA 2430549 6/2002
DE 19731293 1/1999
(Continued)

OTHER PUBLICATIONS

Philip Carden, The New Face of Single Sign-On, Network Computing (Mar. 22, 1999), http://www.networkcomputing.com/1006/1006f1.html.

(Continued)

*Primary Examiner* — Nathan Flynn
*Assistant Examiner* — Abdullah Almamun
(74) *Attorney, Agent, or Firm* — Lowenstein Sandler LLP (57) ABSTRACT

A password management system and method for securing networked client terminals and mobile devices is provided. More specifically, the present invention provides a system and method for encrypting randomly generated administrator-level passwords and providing a means for decrypting the randomly generated passwords for single-use unrestricted access to a designated terminal or mobile device. When unrestricted access to the terminal or mobile device is required, the encrypted administrator-level password is decrypted using a shared symmetric key, which is generated during encryption of the administrator password, to reveal the administrator-level password for the terminal or mobile device. The administrator-level password is a single-use password, wherein upon use of the administrator-level password a new administrator-level password may be automatically generated for the corresponding terminal or mobile device.

17 Claims, 4 Drawing Sheets

(56) References Cited

U.S. PATENT DOCUMENTS

| | | |
|---|---|---|
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,800,590 A | 1/1989 | Vaughan |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,212,792 A | 5/1993 | Gerety et al. |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,315,504 A | 5/1994 | Lemble |
| 5,317,683 A | 5/1994 | Hager et al. |
| 5,321,841 A | 6/1994 | East et al. |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Chang |
| 5,479,530 A | 12/1995 | Nair et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scarmer |
| 5,642,419 A | 6/1997 | Rosen |
| 5,644,493 A | 7/1997 | Motai |
| 5,644,778 A | 7/1997 | Burks et al. |
| 5,649,118 A | 7/1997 | Carlisle et al. |
| 5,653,914 A | 8/1997 | Holmes et al. |
| 5,657,383 A | 8/1997 | Gerber et al. |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,706,452 A | 1/1998 | Ivanov |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray |
| 5,761,647 A | 6/1998 | Boushy |
| 5,761,661 A | 6/1998 | Coussens |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holmann |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,176 A | 9/1998 | Audebert |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |

| Patent | Date | Inventor |
|---|---|---|
| 5,825,863 A | 10/1998 | Walker |
| 5,825,870 A | 10/1998 | Miloslavsky |
| 5,826,023 A | 10/1998 | Hall et al. |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,211 A | 11/1998 | Blakley, III et al. |
| 5,832,460 A | 11/1998 | Bednar |
| 5,832,476 A | 11/1998 | Tada |
| 5,835,580 A | 11/1998 | Fraser |
| 5,835,603 A | 11/1998 | Coutts |
| 5,838,903 A | 11/1998 | Blakely, III et al. |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,190 A | 12/1998 | Kleehammer et al. |
| 5,848,400 A | 12/1998 | Chang |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,862,323 A | 1/1999 | Blakely, III et al. |
| 5,864,830 A | 1/1999 | Armetta et al. |
| 5,864,871 A | 1/1999 | Kitain et al. |
| RE36,116 E | 2/1999 | McCarthy |
| 5,866,889 A | 2/1999 | Weiss et al. |
| 5,870,718 A | 2/1999 | Spector |
| 5,870,725 A | 2/1999 | Bellinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Change |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,933,816 A | 8/1999 | Zeanah |
| 5,933,817 A | 8/1999 | Hucal |
| 5,933,823 A | 8/1999 | Cullen |
| 5,933,827 A | 8/1999 | Cole |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,639 A | 9/1999 | Ohki |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 5,999,596 A | 12/1999 | Walker et al. |
| 5,999,907 A | 12/1999 | Donner |
| 5,999,971 A | 12/1999 | Buckland |
| 6,000,033 A | 12/1999 | Kelley et al. |
| 6,001,016 A | 12/1999 | Walker et al. |
| 6,003,762 A | 12/1999 | Hayashida |
| 6,005,939 A | 12/1999 | Fortenberry et al. |
| 6,006,205 A | 12/1999 | Loeb et al. |
| 6,006,249 A | 12/1999 | Leong |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,032,134 A | 2/2000 | Weissman |
| 6,032,147 A | 2/2000 | Williams et al. |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,067,531 A | 5/2000 | Hoyt et al. |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |

| | | | | | | |
|---|---|---|---|---|---|---|
| 6,073,113 | A | 6/2000 | Guinan | 6,256,664 | B1 | 7/2001 | Donoho et al. |
| 6,075,519 | A | 6/2000 | Okatani et al. | 6,260,026 | B1 | 7/2001 | Tomida et al. |
| 6,076,072 | A | 6/2000 | Libman | 6,266,648 | B1 | 7/2001 | Baker, III |
| 6,081,790 | A | 6/2000 | Rosen | 6,266,683 | B1 | 7/2001 | Yehuda et al. |
| 6,081,810 | A | 6/2000 | Rosenzweig et al. | 6,267,292 | B1 | 7/2001 | Walker et al. |
| 6,081,900 | A | 6/2000 | Subramaniam et al. | 6,269,348 | B1 | 7/2001 | Pare et al. |
| 6,085,168 | A | 7/2000 | Mori et al. | 6,275,944 | B1 | 8/2001 | Kao et al. |
| 6,088,444 | A | 7/2000 | Walker et al. | 6,289,322 | B1 | 9/2001 | Kitchen et al. |
| 6,088,451 | A | 7/2000 | He et al. | 6,298,330 | B1 | 10/2001 | Gardenswartz et al. |
| 6,088,683 | A | 7/2000 | Jalili | 6,298,356 | B1 | 10/2001 | Jawahar et al. |
| 6,088,686 | A | 7/2000 | Walker et al. | 6,301,567 | B1 | 10/2001 | Leong et al. |
| 6,088,700 | A | 7/2000 | Larsen et al. | 6,308,273 | B1 | 10/2001 | Goertzel et al. |
| 6,091,817 | A | 7/2000 | Bertina et al. | 6,308,274 | B1 | 10/2001 | Swift |
| 6,092,192 | A | 7/2000 | Kanevsky et al. | 6,311,275 | B1 | 10/2001 | Jin et al. |
| 6,092,196 | A | 7/2000 | Reiche | 6,317,834 | B1 | 11/2001 | Gennaro et al. |
| 6,095,412 | A | 8/2000 | Bertina et al. | 6,317,838 | B1 | 11/2001 | Baize |
| 6,098,070 | A | 8/2000 | Maxwell | 6,324,524 | B1 | 11/2001 | Lent et al. |
| 6,101,486 | A | 8/2000 | Roberts et al. | 6,327,573 | B1 | 12/2001 | Walker et al. |
| 6,104,716 | A | 8/2000 | Crichton et al. | 6,327,578 | B1 | 12/2001 | Linehan |
| 6,105,012 | A | 8/2000 | Chang et al. | 6,330,543 | B1 | 12/2001 | Kepecs |
| 6,105,865 | A | 8/2000 | Hardesty | 6,332,192 | B1 | 12/2001 | Boroditsky et al. |
| 6,111,858 | A | 8/2000 | Greaves et al. | 6,336,104 | B1 | 1/2002 | Walker et al. |
| 6,112,181 | A | 8/2000 | Shear et al. | 6,339,423 | B1 | 1/2002 | Sampson et al. |
| 6,115,642 | A | 9/2000 | Brown et al. | 6,343,279 | B1 | 1/2002 | Bissonette et al. |
| 6,115,690 | A | 9/2000 | Wong | 6,343,323 | B1 | 1/2002 | Kalpio et al. |
| 6,119,093 | A | 9/2000 | Walker et al. | 6,345,261 | B1 | 2/2002 | Feidelson |
| 6,119,099 | A | 9/2000 | Walker et al. | 6,349,242 | B2 | 2/2002 | Mahaffey |
| 6,128,599 | A | 10/2000 | Walker et al. | 6,349,336 | B1 | 2/2002 | Sit et al. |
| 6,128,602 | A | 10/2000 | Northington et al. | 6,363,381 | B1 | 3/2002 | Lee et al. |
| 6,131,810 | A | 10/2000 | Weiss et al. | 6,366,682 | B1 | 4/2002 | Hoffman et al. |
| 6,134,549 | A | 10/2000 | Regnier et al. | 6,370,649 | B1 | 4/2002 | Angelo et al. |
| 6,134,592 | A | 10/2000 | Montulli | 6,381,587 | B1 | 4/2002 | Guzelsu |
| 6,135,349 | A | 10/2000 | Zirkel | 6,385,591 | B1 | 5/2002 | Mankoff |
| 6,138,106 | A | 10/2000 | Walker et al. | 6,385,652 | B1 | 5/2002 | Brown et al. |
| 6,138,118 | A | 10/2000 | Koppstein et al. | 6,401,125 | B1 | 6/2002 | Makarios et al. |
| 6,141,651 | A | 10/2000 | Riley et al. | 6,401,211 | B1 | 6/2002 | Brezak, Jr. et al. |
| 6,141,666 | A | 10/2000 | Tobin | 6,408,389 | B2 | 6/2002 | Grawrock et al. |
| 6,144,946 | A | 11/2000 | Iwamura | 6,411,933 | B1 | 6/2002 | Maes et al. |
| 6,144,948 | A | 11/2000 | Walker et al. | 6,418,457 | B1 | 7/2002 | Schmidt et al. |
| 6,145,086 | A | 11/2000 | Bellemore et al. | 6,438,594 | B1 | 8/2002 | Bowman-Amuah |
| 6,148,293 | A | 11/2000 | King | 6,438,666 | B2 | 8/2002 | Cassagnol et al. |
| 6,151,584 | A | 11/2000 | Papierniak et al. | 6,446,053 | B1 | 9/2002 | Elliott |
| 6,154,750 | A | 11/2000 | Roberge et al. | 6,449,765 | B1 | 9/2002 | Ballard |
| 6,154,879 | A | 11/2000 | Pare et al. | 6,453,353 | B1 | 9/2002 | Win et al. |
| 6,161,113 | A | 12/2000 | Mora et al. | 6,460,141 | B1 | 10/2002 | Olden |
| 6,161,182 | A | 12/2000 | Nadooshan | 6,470,357 | B1 | 10/2002 | Garcia, Jr. et al. |
| 6,164,533 | A | 12/2000 | Barton | 6,480,958 | B1 | 11/2002 | Harrington |
| 6,170,011 | B1 | 1/2001 | Beck et al. | 6,484,149 | B1 | 11/2002 | Jammes |
| 6,178,511 | B1 | 1/2001 | Cohen et al. | 6,487,641 | B1 | 11/2002 | Cusson et al. |
| 6,182,052 | B1 | 1/2001 | Fulton et al. | 6,490,601 | B1 | 12/2002 | Markus et al. |
| 6,182,142 | B1 | 1/2001 | Win et al. | 6,493,677 | B1 | 12/2002 | Von Rosen et al. |
| 6,182,220 | B1 | 1/2001 | Chen et al. | 6,493,685 | B1 | 12/2002 | Ensel et al. |
| 6,182,225 | B1 | 1/2001 | Hagiuda et al. | 6,496,855 | B1 | 12/2002 | Hunt et al. |
| 6,185,242 | B1 | 2/2001 | Arthur et al. | 6,496,936 | B1 | 12/2002 | French et al. |
| 6,189,029 | B1 | 2/2001 | Fuerst | 6,498,657 | B1 | 12/2002 | Kuntz et al. |
| 6,195,644 | B1 | 2/2001 | Bowie | 6,507,912 | B1 | 1/2003 | Matyas et al. |
| 6,199,077 | B1 | 3/2001 | Inala et al. | 6,510,523 | B1 | 1/2003 | Perlman et al. |
| 6,201,948 | B1 | 3/2001 | Cook et al. | 6,519,763 | B1 | 2/2003 | Kaufer et al. |
| 6,202,005 | B1 | 3/2001 | Mahaffey | 6,526,404 | B1 | 2/2003 | Slater et al. |
| 6,202,054 | B1 | 3/2001 | Lawlor et al. | 6,532,284 | B2 | 3/2003 | Walker et al. |
| 6,202,066 | B1 | 3/2001 | Barkley | 6,535,855 | B1 | 3/2003 | Cahill et al. |
| 6,202,151 | B1 | 3/2001 | Musgrave et al. | 6,535,917 | B1 | 3/2003 | Zamanzadeh et al. |
| 6,202,158 | B1 | 3/2001 | Urano et al. | 6,535,980 | B1 | 3/2003 | Kumar et al. |
| 6,208,978 | B1 | 3/2001 | Walker et al. | 6,539,424 | B1 | 3/2003 | Dutta |
| 6,208,984 | B1 | 3/2001 | Rosenthan | 6,557,039 | B1 | 4/2003 | Leong et al. |
| 6,216,115 | B1 | 4/2001 | Barrameda et al. | 6,574,348 | B1 | 6/2003 | Venkatesan et al. |
| 6,219,639 | B1 | 4/2001 | Bakis et al. | 6,580,814 | B1 | 6/2003 | Ittycheriah et al. |
| 6,219,706 | B1 | 4/2001 | Fan | 6,581,040 | B1 | 6/2003 | Wright et al. |
| 6,222,914 | B1 | 4/2001 | McMullin | 6,584,505 | B1 | 6/2003 | Howard et al. |
| 6,223,168 | B1 | 4/2001 | McGurl et al. | 6,584,508 | B1 | 6/2003 | Epstein et al. |
| 6,226,623 | B1 | 5/2001 | Schein et al. | 6,589,291 | B1 | 7/2003 | Boag et al. |
| 6,226,679 | B1 | 5/2001 | Gupta | 6,592,044 | B1 | 7/2003 | Wong et al. |
| 6,226,752 | B1 | 5/2001 | Gupta et al. | 6,601,175 | B1 | 7/2003 | Arnold et al. |
| 6,227,447 | B1 | 5/2001 | Campisano | 6,609,106 | B1 | 8/2003 | Robertson |
| 6,230,148 | B1 | 5/2001 | Pare et al. | 6,609,113 | B1 | 8/2003 | O'Leary et al. |
| 6,243,688 | B1 | 6/2001 | Kalina | 6,609,125 | B1 | 8/2003 | Layne et al. |
| 6,243,816 | B1 | 6/2001 | Fang et al. | 6,609,198 | B1 | 8/2003 | Wood et al. |
| 6,253,327 | B1 | 6/2001 | Zhang et al. | 6,609,654 | B1 | 8/2003 | Anderson et al. |
| 6,253,328 | B1 | 6/2001 | Smith, Jr. | 6,618,579 | B1 | 9/2003 | Smith et al. |

| | | | | | | |
|---|---|---|---|---|---|---|
| 6,618,806 B1 | 9/2003 | Brown et al. | | 7,840,993 B2 | 11/2010 | Ganesan et al. |
| 6,623,415 B2 | 9/2003 | Gates et al. | | 2001/0011255 A1 | 8/2001 | Asay et al. |
| 6,640,302 B1 | 10/2003 | Subramaniam et al. | | 2001/0012974 A1 | 8/2001 | Mahaffey |
| 6,668,322 B1 | 12/2003 | Wood et al. | | 2001/0016835 A1 | 8/2001 | Hansmann et al. |
| 6,671,818 B1 | 12/2003 | Mikurak | | 2001/0027474 A1 | 10/2001 | Nachman et al. |
| 6,675,261 B2 | 1/2004 | Shandony | | 2001/0029464 A1 | 10/2001 | Schweitzwer |
| 6,684,248 B1 | 1/2004 | Janacek et al. | | 2001/0032184 A1 | 10/2001 | Tenembaum |
| 6,684,384 B1 | 1/2004 | Bickerton et al. | | 2001/0047295 A1 | 11/2001 | Tenembaum |
| 6,687,222 B1 | 2/2004 | Albert et al. | | 2001/0051917 A1 | 12/2001 | Bissonette et al. |
| 6,687,245 B2 | 2/2004 | Fangman et al. | | 2001/0054003 A1 | 12/2001 | Chien et al. |
| 6,697,947 B1 | 2/2004 | Matyas, Jr. et al. | | 2001/0054059 A1 | 12/2001 | Marks et al. |
| 6,714,987 B1 | 3/2004 | Amin et al. | | 2002/0002479 A1 | 1/2002 | Almog et al. |
| 6,718,482 B2 | 4/2004 | Sato et al. | | 2002/0007313 A1 | 1/2002 | Mai et al. |
| 6,718,535 B1 | 4/2004 | Underwood | | 2002/0007460 A1 | 1/2002 | Azuma |
| 6,725,269 B1 | 4/2004 | Megiddo | | 2002/0010599 A1 | 1/2002 | Levison |
| 6,735,695 B1 | 5/2004 | Gopalakrishnan et al. | | 2002/0010668 A1 | 1/2002 | Travis et al. |
| 6,738,779 B1 | 5/2004 | Shapira | | 2002/0018585 A1 | 2/2002 | Kim |
| 6,751,654 B2 | 6/2004 | Massarani et al. | | 2002/0019938 A1 | 2/2002 | Aarons |
| 6,754,833 B1 | 6/2004 | Black et al. | | 2002/0023108 A1 | 2/2002 | Daswani et al. |
| 6,755,341 B1 | 6/2004 | Wong et al. | | 2002/0029269 A1 | 3/2002 | McCarty et al. |
| 6,763,388 B1 | 7/2004 | Tsimelzon | | 2002/0032613 A1 | 3/2002 | Buettgenbach et al. |
| 6,766,370 B2 | 7/2004 | Glommen et al. | | 2002/0032650 A1 | 3/2002 | Hauser et al. |
| 6,769,605 B1 | 8/2004 | Magness | | 2002/0059141 A1 | 5/2002 | Davies et al. |
| 6,772,146 B2 | 8/2004 | Khemlani et al. | | 2002/0069172 A1 | 6/2002 | Omshehe et al. |
| 6,785,810 B1 | 8/2004 | Lirov et al. | | 2002/0077964 A1 | 6/2002 | Brody et al. |
| 6,789,115 B1 | 9/2004 | Singer et al. | | 2002/0077978 A1 | 6/2002 | O'Leary et al. |
| 6,792,572 B1 | 9/2004 | Frohlick | | 2002/0087447 A1 | 7/2002 | McDonald et al. |
| 6,805,288 B2 | 10/2004 | Routhenstein et al. | | 2002/0087471 A1 | 7/2002 | Ganesan et al. |
| 6,810,395 B1 | 10/2004 | Bharat | | 2002/0095443 A1 | 7/2002 | Kovack |
| 6,819,219 B1 | 11/2004 | Bolle et al. | | 2002/0099826 A1 | 7/2002 | Summers et al. |
| 6,820,202 B1 | 11/2004 | Wheeler et al. | | 2002/0099936 A1 | 7/2002 | Kou et al. |
| 6,826,696 B1 | 11/2004 | Chawla et al. | | 2002/0104006 A1 | 8/2002 | Boate et al. |
| 6,832,202 B1 | 12/2004 | Schuyler et al. | | 2002/0104017 A1 | 8/2002 | Stefan |
| 6,832,587 B2 | 12/2004 | Wampula et al. | | 2002/0107788 A1 | 8/2002 | Cunningham |
| 6,847,991 B1 | 1/2005 | Kurapati | | 2002/0114470 A1 | 8/2002 | Mauro et al. |
| 6,856,970 B1 | 2/2005 | Campbell et al. | | 2002/0143874 A1 | 10/2002 | Marquette et al. |
| 6,868,391 B1 | 3/2005 | Hultgren | | 2002/0152163 A1 | 10/2002 | Bezos et al. |
| 6,892,231 B2 | 5/2005 | Jager | | 2002/0156900 A1 | 10/2002 | Marquette et al. |
| 6,907,566 B1 | 6/2005 | McElfresh et al. | | 2002/0165949 A1 | 11/2002 | Na |
| 6,925,481 B2 | 8/2005 | Singhal et al. | | 2002/0174010 A1 | 11/2002 | Rice, III |
| 6,934,848 B1 | 8/2005 | King et al. | | 2002/0178113 A1 | 11/2002 | Clifford et al. |
| 6,937,976 B2 | 8/2005 | Apte | | 2002/0184507 A1 | 12/2002 | Makower et al. |
| 6,938,158 B2 | 8/2005 | Azuma | | 2002/0188869 A1 | 12/2002 | Patrick |
| 6,950,936 B2 | 9/2005 | Subramaniam et al. | | 2002/0191548 A1 | 12/2002 | Ylonen et al. |
| 6,954,932 B2 | 10/2005 | Nakamura et al. | | 2002/0198806 A1 | 12/2002 | Blagg et al. |
| 6,957,337 B1 | 10/2005 | Chainer et al. | | 2003/0001888 A1 | 1/2003 | Power |
| 6,965,939 B2 | 11/2005 | Cuomo et al. | | 2003/0018915 A1 | 1/2003 | Stoll |
| 6,976,164 B1 | 12/2005 | King et al. | | 2003/0023880 A1 | 1/2003 | Edwards et al. |
| 6,980,962 B1 | 12/2005 | Arganbright et al. | | 2003/0034388 A1 | 2/2003 | Routhenstein et al. |
| 6,983,421 B1 | 1/2006 | Lahti et al. | | 2003/0037131 A1 | 2/2003 | Verma |
| 6,992,786 B1 | 1/2006 | Breding et al. | | 2003/0037142 A1 | 2/2003 | Munger et al. |
| 7,006,983 B1 | 2/2006 | Packes et al. | | 2003/0040995 A1 | 2/2003 | Daddario et al. |
| 7,010,512 B1 | 3/2006 | Gillin et al. | | 2003/0041165 A1 | 2/2003 | Spencer et al. |
| 7,020,696 B1 | 3/2006 | Perry et al. | | 2003/0046587 A1 | 3/2003 | Bheemarasetti et al. |
| 7,032,110 B1 | 4/2006 | Su et al. | | 2003/0046589 A1 | 3/2003 | Gregg |
| 7,051,199 B1 | 5/2006 | Berson et al. | | 2003/0051026 A1 | 3/2003 | Carter et al. |
| 7,051,330 B1 | 5/2006 | Kaler et al. | | 2003/0055871 A1 | 3/2003 | Roses |
| 7,058,817 B1 | 6/2006 | Ellmore | | 2003/0070069 A1 | 4/2003 | Belapurkar et al. |
| 7,076,453 B2 | 7/2006 | Jammes et al. | | 2003/0070084 A1 | 4/2003 | Satomaa et al. |
| 7,080,036 B1 | 7/2006 | Drummond et al. | | 2003/0074580 A1 | 4/2003 | Knouse et al. |
| 7,089,203 B1 | 8/2006 | Crookshanks | | 2003/0079147 A1 | 4/2003 | Hsieh et al. |
| 7,089,208 B1 | 8/2006 | Levchin et al. | | 2003/0084345 A1 | 5/2003 | Bjornestad et al. |
| 7,089,503 B1 | 8/2006 | Bloomquist et al. | | 2003/0084647 A1 | 5/2003 | Smith et al. |
| 7,093,020 B1 | 8/2006 | McCarty et al. | | 2003/0088552 A1 | 5/2003 | Bennett et al. |
| 7,093,282 B2 | 8/2006 | Hillhouse | | 2003/0105981 A1 | 6/2003 | Miller et al. |
| 7,103,556 B2 | 9/2006 | Del Rey et al. | | 2003/0110399 A1 | 6/2003 | Rail |
| 7,117,239 B1 | 10/2006 | Hansen | | 2003/0115160 A1 | 6/2003 | Nowlin et al. |
| 7,124,101 B1 | 10/2006 | Mikurak | | 2003/0119642 A1 | 6/2003 | Gates et al. |
| 7,134,075 B2 | 11/2006 | Hind | | 2003/0149594 A1 | 8/2003 | Beazley et al. |
| 7,137,006 B1 | 11/2006 | Grandcolas et al. | | 2003/0154171 A1 | 8/2003 | Karp et al. |
| 7,139,686 B1 | 11/2006 | Critz | | 2003/0154403 A1 | 8/2003 | Keinsley et al. |
| 7,185,094 B2 | 2/2007 | Marquette et al. | | 2003/0159072 A1 | 8/2003 | Bellinger et al. |
| 7,188,181 B1 | 3/2007 | Squier et al. | | 2003/0163700 A1 | 8/2003 | Paatero |
| 7,197,470 B1 | 3/2007 | Arnett | | 2003/0163733 A1 | 8/2003 | Barriga-Caceres et al. |
| 7,203,909 B1 | 4/2007 | Horvitz et al. | | 2003/0167229 A1 | 9/2003 | Ludwig et al. |
| 7,299,201 B2 | 11/2007 | Jammes | | 2003/0177067 A1 | 9/2003 | Cowell et al. |
| 7,321,864 B1 | 1/2008 | Gendler | | 2003/0191549 A1 | 10/2003 | Otsuka et al. |
| 7,370,011 B2 | 5/2008 | Bennett | | 2003/0204460 A1 | 10/2003 | Robinson et al. |
| 7,571,489 B2 | 8/2009 | Ong et al. | | 2003/0225688 A1 | 12/2003 | Dobbins |

| | | | |
|---|---|---|---|
| 2004/0031856 | A1 | 2/2004 | Atsmon et al. |
| 2004/0049702 | A1 | 3/2004 | Subramaniam et al. |
| 2004/0117409 | A1 | 6/2004 | Scahill et al. |
| 2004/0153378 | A1 | 8/2004 | Perkowski |
| 2004/0215514 | A1 | 10/2004 | Quinlan |
| 2004/0254991 | A1 | 12/2004 | Malik et al. |
| 2005/0080747 | A1 | 4/2005 | Anderson et al. |
| 2005/0082362 | A1 | 4/2005 | Anderson et al. |
| 2005/0086160 | A1 | 4/2005 | Wong et al. |
| 2005/0086177 | A1 | 4/2005 | Anderson et al. |
| 2005/0091126 | A1 | 4/2005 | Junger |
| 2005/0120180 | A1 | 6/2005 | Schornbach et al. |
| 2005/0193056 | A1 | 9/2005 | Schaefer et al. |
| 2005/0278641 | A1 | 12/2005 | Mansour et al. |
| 2006/0000904 | A1 | 1/2006 | Vernay et al. |
| 2006/0029261 | A1 | 2/2006 | Hoffman et al. |
| 2006/0083228 | A1 | 4/2006 | Ong et al. |
| 2006/0116949 | A1 | 6/2006 | Wehunt et al. |
| 2006/0198517 | A1 | 9/2006 | Cameron et al. |
| 2006/0274970 | A1 | 12/2006 | Seki et al. |
| 2007/0014400 | A1 | 1/2007 | Wack et al. |
| 2008/0056499 | A1 | 3/2008 | Vanstone |
| 2008/0270791 | A1 | 10/2008 | Nystrom et al. |
| 2011/0099614 | A1 | 4/2011 | Ichikawa et al. |

FOREIGN PATENT DOCUMENTS

| | | |
|---|---|---|
| EP | 855659 | 7/1998 |
| EP | 884877 | 12/1998 |
| EP | 917119 | 5/1999 |
| EP | 1014318 | 6/2000 |
| EP | 1022664 | 7/2000 |
| EP | 1056043 | 11/2000 |
| EP | 1089516 | 4/2001 |
| JP | 10187467 | 7/1998 |
| JP | 2003-24329 | 11/2000 |
| JP | 2001-134672 | 5/2001 |
| JP | 2005-242976 | 9/2005 |
| WO | 97/43736 | 11/1997 |
| WO | 99/40507 | 8/1999 |
| WO | 99/52051 | 10/1999 |
| WO | 00/68858 | 11/2000 |
| WO | 01/18656 | 3/2001 |
| WO | 01/35355 | 5/2001 |
| WO | 01/43084 | 6/2001 |
| WO | 01/88659 | 11/2001 |
| WO | 02/17082 | 2/2002 |
| WO | 2004/079603 | 9/2004 |

OTHER PUBLICATIONS

Primavera Systems Delivers Expedition Express, Bus. Wire, Feb. 23, 1999.
Primavera Systems, Inc., Expedition Contract Control Software Version 6.0 User's Guide (1998).
Primavera Systems, Inc., http://www.primavera.com (1999).
Primavera Systems, Inc., Primavera and PurchasePro.com to Create E-Commerce Marketplace for Construction Industry, Sep. 21, 1999, available at http://web.archive.org/web/2000412175935/http://www.purchasepro.com (last visited Jun. 23, 2005).
Product Data Integration Technologies, Inc., http://www.pdit.com (last visited Apr. 26, 1999).
Richard Mitchell, Netlink Goes After an Unbanked Niche, Card Tech., Sep. 1999, at 22.
Robert Barnham, Network brings together producers and companies, Feb. 1, 1994, at 80.
Roberta Fusaro, Builders moving to Web tools, ComputerWorld, Nov. 16, 1998, at 51.
Robyn Meredith, Internet bank moves closer to virtual reality, USA Today, May 5, 1995, at B1.
Safe Single-Sign-On Protocol with Minimal Password Exposure No-Decryption, and Technology-Adaptivity, IBM Technical Disclosure Bulleting 38:3, pp. 245-248 (Mar. 1995).
Server/Applet/HTML Authentication Process with Single Sign-On, IBM Research Disclosure 429128, pp. 163-165 (Jan. 2000).
Shimon-Craig Van Collie, Construction Loan Tool from PriMerit, New Trend, Bank Mgmt., Apr. 1990, at 60.
Siebel Systems, Inc., http://www.siebel.com (last visited Nov. 17, 1999).
SmartAxis bv, http://www.smartaxis.co.uk/seller/howitworks.html (last visited Feb. 23, 2001).
Steven Marlin, Chasing document management, Inform, pp. 76-82 (Apr. 1999).
Stuart J. Johnston, Pondering Passport: Do you trust microsoft with you data?, PC World, Sep. 24, 2001.
Sun Microsystems, Applets, http://java.sun.com (last visited May 21, 1999).
Sun Microsystems, Java Remote Method Invocation Interface, http://java.sun.com (last visited May 21, 1999).
Sun Microsystems, Java Servlet API, http://java.sun.com (last visited May 21, 1999).
Sun Microsystems, Java Technology in the Real World, http://java.sun.com (last visited May 21, 1999).
Sun Microsystems, JNDI Overview, http://java.sun.com (last visited May 21, 1999).
Sun Microsystems, Staying in Touch with JNDI, http://java.sun.com (last visited May 21, 1999).
Sun Microsystems, The JDBC Data Access API, http://java.sun.com (last visited May 21, 1999).
Temporary Global Passwords, IBM Technical Disclosure Bulletin 26:3, pp. 451-453 (Mar. 1993).
The check is in the E-mail, Info. Today, Mar. 1, 1995, at 43.
ThomasNet, Inc., http://www.thomasnet.com (last visited Apr. 26, 1999).
ThomasNet, Inc., SoluSource for Engineers by Engineers, http://www.solusource.com (last visited Apr. 26, 1999).
Timothy M. Chester, Cross-Platform Integration with XML and SOAP, IP Pro, pp. 26-34 (Sep./Oct. 2001).
Tom Jepsen, SOAP Cleans up Interoperability Problems on the Web, IT Pro, pp. 52-55 (Jan./Feb. 2001).
Tomas Hernandez Jr., Software Solutions, Building Design & Construction, Nov. 1999, at 38.
U.S. Small Business Administration, PRO-Net, www.sba.gov (last visited Jun. 8, 1999).
V. Ryan et al, Internet Engineering Task Force, Schema for Representing CORBA Objects in an LDAP Directory (work in progress), http://tools.ietf.org/html/draft-ryan-corba-schema-00 (Apr. 15, 1999).
Vanessa Houlder, OFT gives the individual top priority, Fin. Times, Jun. 8, 1994.
VISA International, Consortium Created to Manage Common Electronic Purse Specifications, http://www.visa.com/av/news/PRmisc051199.vhtml (last visited Feb. 23, 2001).
W. Richard Mosig Jr., Software Review: The Construction Project Manager, Cost Engineering, Jan. 1996, at 7.
Wingspan Bank, At Your Request, http://www.wingspanbank.com (last visited Aug. 10, 1999).
ABC News Internet Ventures, Getting Smart with Java, http://abcnews.go.com/sections/DailyNews/amex_java000606.html (last visited Jun. 6, 2000).
Amy Cortese et al, Cyberspace: Crafting software that will let you build a business out there, Bus. Week, Feb. 27, 1995, at 78.
Amy K. Larsen, Internet Goes to Work for Builders, InternetWeek, Nov. 16, 1998, at 26.
Anne Knowles, Improved Internet security enabling on-line commerce, PC Week, Mar. 20, 1995.
Anne Thomas, Sun Microsystems, Enterprise Javabeans Technology, http://java.sun.com (last visited May 21, 1999).
Associates National Bank (Delaware), Our Cards, http://www.theassociates.com (last visited Apr. 6, 1999).
Aversion Therapy: Banks overcoming fear of the 'Net to develop safe Internet-based payment system with Netscape Communicator, Network World, Dec. 12, 1994.
Barry D. Bowen, Sun Microsystems, Banking on JAVA Technology, http://java.sun.com (last visited May 21, 1999).
Bechtel Construction Operations Incorporated Standardizes on Primavera's Expedition Contract Management Software, Bus. Wire, Jul. 27, 1999.
Calyx Software, POINT for Windows Version 3.x Interface Marketing Guide (Dec. 8, 1999).

David Bank, Cash, Check, Charge—what's next?, Seattle Times, Mar. 6, 1995, at D-1.

David D. Owen, Facilities Planning and Relocation 108, 110, 112-114, 117-127, 137-138, 199-217, 241, 359 (R.S. Means Company, Inc. 1993).

David G. Cotts, The Facility Management Handbook 135-40 (2d ed. 1998).

David P. Kormann et al, Risks of the Passport Single Signon Protocol, 33 Computer Networks 51-58 (2000).

David Post, E-Cash: Can't Live With It, Can't Live Without It, Am. Lawyer, Mar. 1995, at 116.

Dominique Deckmyn, San Francisco Manages $45M Project Via Web-Based Service, ComputerWorld, Aug. 9, 1999, at 14.

Don Clark, Microsoft, Visa to Jointly Develop PC Electronic-Shopping Software, Wall St. J., Nov. 9, 1994, at B9.

eCharge Corporation, http://www.echarge.com/company/index.htm (last visited Dec. 3, 1999).

FreeMarkets Online, Inc., http://www.freemarkets.com (last visited Apr. 1999).

G&D America's Multi-application Smart Card Selected for Combined Payroll and 'Virtual Banking' Program in Mexico, Bus. Wire, Apr. 24, 1998.

GE TPN Post Service Use Guidelines, Getting Started (Apr. 26, 1999).

GE TPN Post Service Use Guidelines, Resource Center (Apr. 26, 1999).

Gerry Vandenengel, Cards on the Internet: Advertising on a $3 Bill, World Card Tech., Feb. 1995, at 46.

Harris InfoSource, http://www.harrisinfo.com (last visited Apr. 26, 1999).

Hewlett-Packard Co., Understanding Product Data Management (Apr. 26, 1999).

Jeffrey Kutler, A different drummer on the data highway, Am. Banker, May 12, 1995, at 14.

Jeffrey Kutler, Cash Card Creator Looking Beyond Mondex, Am. Banker, Feb. 9, 1995, at 16.

John N. Frank, Beyond direct mail, Credit Card Mgmt., Aug. 1996, at 54.

Jonathan Berry et al, Database: A Potent New Tool for Selling, Bus. Week, Sep. 5, 1994, at 56.

Karen Epper, A player goes after big bucks in cyberspace, Am. Banker, May 5, 1995, at 17.

Keith Brown, The Builders Revolution, BuildNet Publishing (1996).

Kennedy Maiz, Fannie Mae on the Web, Newsbyte, May 8, 1995.

Kim A. Strassel, Dutch Software Concern Experiments with Electronic 'Cash' in Cyberspace, Wall St. J., Apr. 17, 1995, at B6.

Ko Fujimura et al, A World Wide Supermarket Scheme Using Rights Trading System, Proc. 7th Int'l Conf. on Parallel and Distributed Systems: Workshops, pp. 289-294 (Jul. 2000).

Ko Fujimura et al, XML Voucher: Generic Voucher Language, Internet Engineering Task Force, http://www.

Lester D. Taylor, Telecommunications Demand Analysis in Transition, IEEE Proc. 31st Int'l Conf. on System Sciences, pp. 409-415 (1998).

Lynda Radosevich, Is workflow working?, CNN.com (Apr. 6, 1999), http://www.cnn.com/TECH/computing/9904/06/workflow.ent.idg.

M. Alshawi et al, An IFC Web-Based Collaborative Construction Computer Environment: Wisper, Proc. Int'l Conf. Construction IT (1999).

Markus Jakobsson et al, Secure and lightweight advertising on the Web, 31 Computer Networks 1101-1109 (1999).

Marvin Sirbu et al, NetBill: An Internet Commerce System Optimized for Network Delivered Services, IEEE Personal Comm., pp. 34-39 (Aug. 1995).

Mary C. Lacity et al, The Information Systems Outsourcing Bandwagon, 35 Sloan Mgmt. Rev. 73 (1993).

Method of Protecting Data on a Personal Computer, IBM Technical Disclosure Bulletin 26:6, p. 2530 (Nov. 1985).

Muse Technologies, Inc., http://www.musetechnologies.com (last visited Apr. 26, 1999).

Nelson E. Hastings et al, A Case Study of Authenticated and Secure File Transfer: The Iowa Campaign Finance Reporting System (ICFRS), Performance, Computing and Comm. Conf., pp. 532-538 (Feb. 1997).

Object Management Group, CORBA for Beginners, http://www.omg.org (last visited May 25, 1999).

Object Management Group, CORBA Overview, http://pent21.infosys.tuwein.ac.at (last visited May 25, 1999).

Object Management Group, Library, http://www.omg.org (last visited May 25, 1999).

Object Management Group, What is CORBA?, http://www.omg.org (last visited May 25, 1999).

Omware, Inc., http://web.archive.org/web/20000226033405/www.omware.com/products.html (last visited Nov. 28, 2005).

Paul Seibert, Facilities Planning & Design for Financial Institutions 15, 272, 274-77 (1996).

SYSTEM AND METHOD FOR GENERATING AND MANAGING ADMINISTRATOR PASSWORDS

CROSS-REFERENCE TO RELATED APPLICATIONS

This application is a continuation application of U.S. application Ser. No. 12/360,100, filed Jan. 26, 2009, which in turn claims the benefit of priority under 35 U.S.C. §119(e) to U.S. Provisional Patent Application No. 61/023,347, filed Jan. 24, 2008. U.S. application Ser. No. 12/360,100 and U.S. Provisional Patent Application No. 61/023,347 are incorporated by reference herein in their entireties.

BACKGROUND OF THE INVENTION

1. Field of the Invention

The present invention relates generally to computer security. More specifically, the present invention is directed at a system and method for generating and managing an administrator-level password unique to a workstation residing on a defined network.

2. Description of the Prior Art

Computer security is a significant issue for network administrators. With the vast amount of sensitive data residing on and accessible through computer networks, the likelihood and consequences of a security breach is a constant concern. These concerns have commonly been addressed by network administrators through the implementation of various end-user restrictions and strict guidelines directed at minimizing potential threats. While these measures can be used as an effective measure for securing access to a network, an often unintended result is reduced access for authorized users.

Given that the need to provide an effective level of network security is often at odds with the need to provide adequate access to support a network, administrators are constantly faced with the burden of discerning to what extent one interest must override the other. The management of administrator-level passwords, which typically provide unrestricted access to workstations, is a prime example of this problem.

An administrator-level password is often provided to various technical support professionals to provide immediate access to a workstation in need of support. In providing such access, many organizations typically utilize a limited number of administrator-level passwords that can be shared among authorized professionals. These shared administrator-level passwords are frequently referred to as common administrator passwords and permit the holder to obtain unrestricted access to a workstation without having knowledge of a user-defined password associated with the workstation.

Although the foregoing measure provides a certain level of security, while relieving the burden of having to manage and secure a repository of unique administrator-level passwords for each workstation on a network, the very existence of common administrator passwords present a serious security risk since any individual with knowledge of at least one of these passwords may obtain unrestricted access to any number of workstations on the network.

In view of the foregoing inherent security concerns related with conventional methods, it is desirable to provide an improved means for securing individual workstations on a defined network. Accordingly, a system and method for generating and managing an administrator-level password unique to each workstation residing on a defined network is provided by the present invention.

SUMMARY OF THE INVENTION

Preferred embodiments of the present invention are deployed in two phases. In the first phase, a unique administrator-level password is randomly generated for a computer terminal or mobile device and encrypted to create a breakglass string, the breakglass string being visibly accessible to a user of the workstation or mobile device or, alternatively, retrievable from a corresponding server database. In the second phase, the breakglass string is decrypted by an authorized user to reveal the uniquely generated administrator-level password associated with the workstation or mobile device.

The breakglass string may be a string of characters in the form of cipher text representing the encrypted administrator-level password randomly generated for and unique to a particular terminal or mobile device. When the cipher text is decrypted and the administrator-level password for accessing the corresponding terminal or mobile device is revealed, the breakglass string is deemed obsolete and a new unique administrator-level password is automatically generated and encrypted for the terminal or mobile device being accessed. Therefore, once revealed, the administrator-level password can not be used again for regaining access to the same terminal or mobile device, thereby providing a secure single-use administrator-level password.

In the first phase of the present invention, a string of random characters representing an administrator-level password, or any other applicable password, is automatically generated for a target terminal. A Random Password Management (RPM) agent, which may be an application residing locally on the target terminal or made accessible via a remote server, may be configured to generate the random string of characters representing the administrator-level password and a symmetric secret key for encrypting the same. The symmetric secret key may be generated by retrieving public and private keys associated with the target terminal deploying the RPM agent, an RPM server public key, and a unique identifier associated with the target terminal.

Once generated, the symmetric secret key is applied to the randomly generated administrator-level password in a symmetric encryption scheme, thereby yielding a breakglass string of characters. In a preferred embodiment of the present invention the breakglass string is stored in the registry and displayed on the target terminal. For example, the breakglass string may be embedded in the wallpaper of a desktop environment displayed on the monitor of the target terminal. Alternatively, the breakglass string may also be stored in a server database to allow authorized users to obtain access to the target terminal.

When access to the target terminal is required by an authorized user, the second phase of the present invention is deployed. The breakglass string, along with a unique identifier for the target terminal, is retrieved through a Random Password Recovery System (RPRS), which may be deployed from a remote terminal and coupled to an RPM database server, to decrypt the breakglass string and reveal the administrator-level password for accessing the target terminal. Thereafter, the RPM agent may be configured to automatically generate a new unique administrator-level password for encryption in connection with the target terminal.

BRIEF DESCRIPTION OF THE DRAWINGS

The above and other objects and advantages of the present invention will become apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
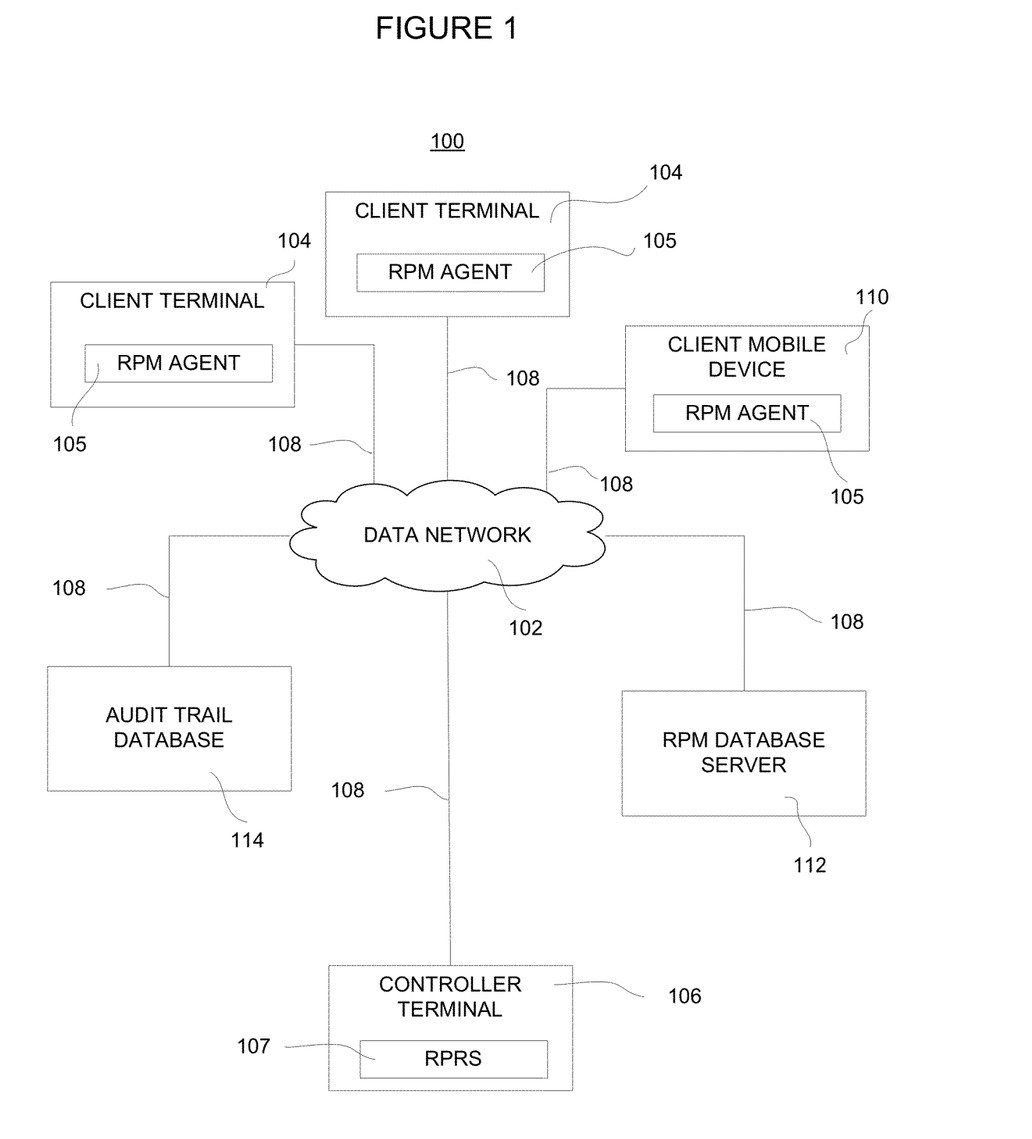
FIG. 1 illustrates a block diagram of an exemplary communication system for implementing the random password management scheme described in accordance with preferred embodiments of the present invention.

An exemplary system 100 for implementing the password management processes of the present invention is illustrated in FIG. 1. In accordance with a preferred embodiment of the present invention, system 100 may be comprised of a data network 102, one or more client terminals 104 configured with a random password management (RPM) agent 105, one or more mobile devices 110 configured with RPM agent 105, one or more database servers 112, 114 and one or more controller terminals 106 configured with a random password recovery system (RPRS) application 107. Client terminals 104, mobile devices 110, database servers 112, 114 and controller terminal 106 are coupled to data network 102 via a communication means 108. Communication means 108 may be achieved through the use of any well-known wired and wireless networking and data management protocols.

RPM database server 112 may be configured for maintaining a secure record of breakglass strings and their corresponding computer IDs. Database server 112 can further be configured to perform periodic data collection from a plurality of workstations in a given network. Given that database server 112 may store breakglass strings corresponding to a plurality of workstations in any given network, controller terminal 106 may be configured for querying database server 112. As illustrated in FIG. 1, database server 112 may be queried via communication means 108.

Figure 2:
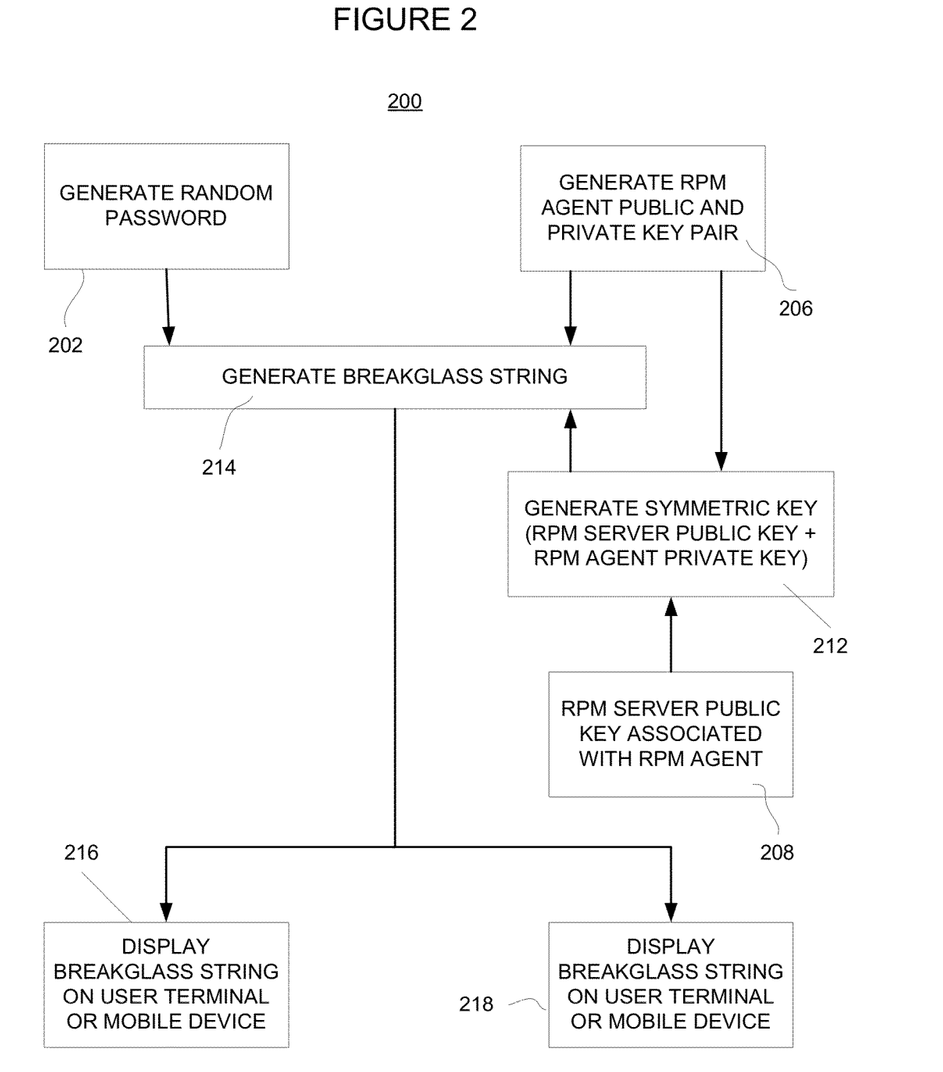
FIG. 2 is a process flowchart for illustrating steps employed in generating a breakglass string in accordance with an embodiment of the present invention.

In FIG. 2, a process flow 200 is provided to illustrate the steps employed in generating a breakglass string. In accordance with a preferred embodiment of the present invention, the breakglass string is a cipher text representative of an encrypted administrator-level password, which may be visibly accessible to a user on a display coupled to client terminal 104 or mobile device 110 or, alternatively, retrievable from RPM database server 112. Process flow 200 may be initiated, for example, when a user logs into terminal 104. Alternatively, process flow 200 may be deployed in accordance with predefined time intervals measured from the instance a user logs onto terminal 104 or, alternatively, from the instance a new administrator-level password is created. Various triggers for initiating process flow 200 may be envisioned and are well within the scope of the present invention.

Upon initiating process flow 200, a unique administrator-level password is randomly generated, at step 202, for a terminal 104 or mobile device 110. The term "administrator-level password" is intended to include, but is not limited to, a string of characters required for gaining unrestricted access to terminal 104 or mobile device 110. The administrator-level password may be an alpha-numeric string generated, for example, by a randomizer application residing on terminal 104, mobile device 110 or a remote server 112 coupled to the same. The randomizer application for generating the administrator-level password may operate as a stand-alone application, but is preferably integrated as part of RPM agent 105. The randomizer may be configured to generate, at steps 206 and 208, 256 bit elliptic curve key pairs for RPM agent keys and RPM server keys for use in generating a shared symmetric key, at step 212, to encrypt the administrator-level password represented by a breakglass string, at step 214.

When a unique administrator-level password is generated, its use is preferred to be the only means for gaining unrestricted access to the corresponding client terminal 104 or mobile device 110. For example, a helpdesk technician needing to troubleshoot client terminal 104 or mobile device 110 would require knowledge of the unique administrator-level password generated by, and associated with, that particular terminal or mobile device in order to obtain unrestricted access for purposes of troubleshooting. Having generated the administrator-level password for client terminal 104 or mobile device 110, process flow 200 may then transition to the creation of a breakglass string, thereby encrypting the newly created administrator-level password.

The present invention makes use of a symmetric key, generated at step 212, using an RPM agent private key and an RPM server public key associated with RPM agent 105, which are generated and retrieved, respectively, at steps 206 and 208. For example, an Elliptic Curve Diffie-Hellman (ECDH) algorithm may be used in conjunction with the RPM agent private key and RPM server public key of the present invention to generate the symmetric key. Upon generating the symmetric key, its use in combination with an RPM agent public key, also generated at step 206, and the administrator-level password, randomly generated at step 202, results in the generation of the corresponding breakglass string, at step 214.

To encrypt the randomly generated administrator-level password, the Advanced Encryption Standard (AES) and a Base64 encryption may be employed for example. The 256 bit RPM server and private keys generated may be loaded and used in conjunction with the ECDH algorithm to generate the 256 bit shared symmetric key. Thereafter, the AES256 key and the AES initial vector may be generated with the host-name of client terminal 104. The randomly generated administrator-level password may then be encrypted to a 16 byte cipher-text and appended with the 256 bit (32 bytes) elliptic curve RPM agent public key, through use of the x-coordinate of point W in the RPM agent public key. The appended administrator password and RPM agent public key are then subjected to Base64 encoding, whereby the output is the breakglass string. The utilized RPM keys are then deleted and a new pair is generated in the next encryption round.

The breakglass string, generated at step 214, may then be stored, at step 218, in a registry associated with client terminal 104 or mobile device 110 and RPM database server 112 and displayed, at step 216, on client terminal 104 or mobile device 110. The breakglass string is a single-use string for revealing the administrator-level password associated with a particular client terminal 104 or mobile device 110. A user requiring unrestricted access to the particular terminal 104 or mobile device 110 must possess the breakglass string to obtain the administrator-level password. Despite the fact that the breakglass string may be displayed on client terminal 104 or mobile device 110, the breakglass string can not be decrypted to reveal the administrator-level password without knowledge of the unique computer ID associated with client terminal 104 or mobile device 110, and retrieval of a corresponding RPM server private key and the RPM agent public key.

RPM agent 105 deployed on client terminal 104 or mobile device 110 may be configured to remain idle until an authorized user is in need of unrestricted access. Absent unrestricted access of client terminal 104 or mobile device 110, the administrator-level password and corresponding breakglass string may remain unchanged. In accordance with the preferred embodiment of the present invention, client terminal 104 or mobile device 110 are assigned a new administrator-level password immediately upon use of the previously designated administrator-level password or upon expiration of a predetermined time period, whichever occurs first.

Figure 3:
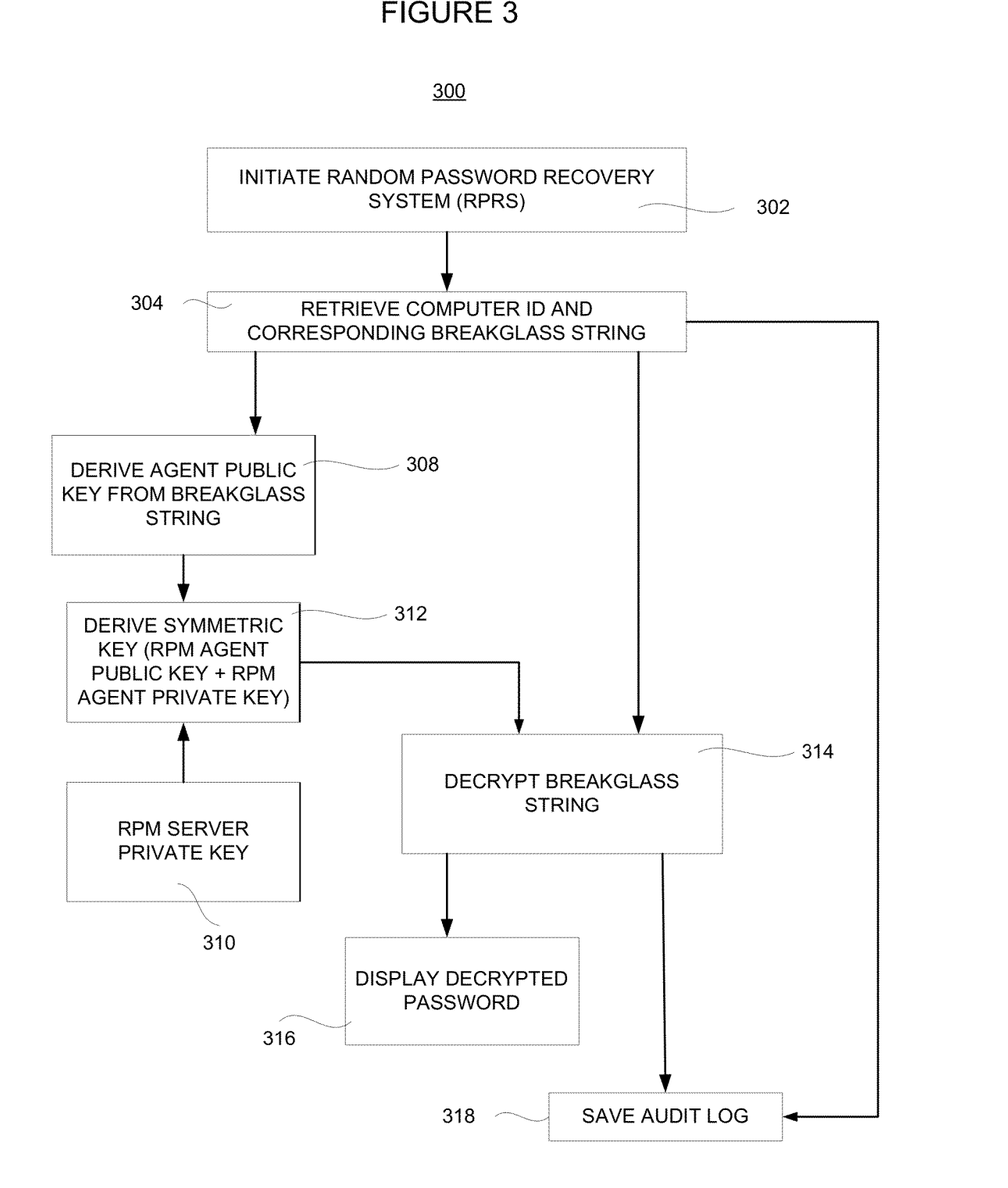
FIG. 3 is a process flowchart for illustrating steps employed in decrypting a breakglass string in accordance with an embodiment of the present invention.

In FIG. 3, a process flow 300 is provided to illustrate the steps employed in deciphering the breakglass string and retrieving the unique administrator-level password needed to gain unrestricted access to client terminal 104 or mobile device 110. RPRS application 107 may be initiated, at step 302, to begin the process of deciphering the breakglass string. RPRS application 107 may be a stand-alone application provided locally on controller terminal 106, as illustrated in FIG. 1. Alternatively, RPRS application 107 may be deployed from a remote location, such as RPM database server 112.

Upon initiating RPRS application 107, at step 302, a computer ID and breakglass string corresponding to client terminal 104 or mobile device 110 is retrieved, at step 304. Thereafter, at steps 308 and 310, the RPM agent public key is derived from the breakglass string and the RPM server private key is retrieved, respectively. The RPM agent public key and RPM server private key are then used, at step 312, to derive the symmetric key needed to decrypt the breakglass string, at step 314. The decrypted administrator-level password is displayed, at step 316, and the corresponding password decryption request is saved, at step 318, in an audit log, which may be maintained, for example, in audit trail database 114.

An audit trail may be kept, at step 318, to log all activity associated with a breakglass string for a particular client terminal 104 or mobile device 110. The implementation of an audit trail further increases security measures provided by the present invention. The audit trail may be configured, for example, to track specific actions taken via RPRS application 107, a corresponding time log of those actions, the location or corresponding computer ID from which a request originated, other applicable information or any suitable combination thereof.

In decrypting the breakglass string the process may begin, for example, with loading the previously described 256 bit elliptic curve RPM server key and performing Base64 decoding on the breakglass string, thereby generating a 16 byte cipher-text and a 32 byte RPM agent public key. The y coordinate of point W in the RPM agent public key may then be calculated to enable reconstruction of the RPM agent public key. With the RPM agent public key and RPM server private key, an ECDH algorithm may then be used to regenerate the shared symmetric key. Having regenerated the symmetric key, AES265 decryption may then be performed on the cipher text representing the administrator password, thereby revealing the unique administrator-level password associated with the client terminal 104 or mobile device 110 for which unrestricted access is required.

It is important to note that upon use of the administrator-level password to gain unrestricted access to client terminal 104 or mobile device 110, RPM agent 105 may be configured to generate a new administrator-level password, rendering the administrator-level password used to gain unrestricted access and the corresponding breakglass string obsolete for future unrestricted access. Therefore, upon use of the administrator-level password corresponding to client terminal 104 or mobile device 110, process flow 200 may be reinitiated to create a new administrator-level password. In an alternative embodiment, a new administrator-level password may be created upon detection that the corresponding breakglass string has been deciphered by RPRS application 107 to reveal the present administrator-level password, irrespective of whether or not the administrator-password was ever used. Such an embodiment may be deployed immediately after deciphering of the breakglass string or after a predetermined lapse of time from the time the breakglass string is deciphered.

Figure 4:
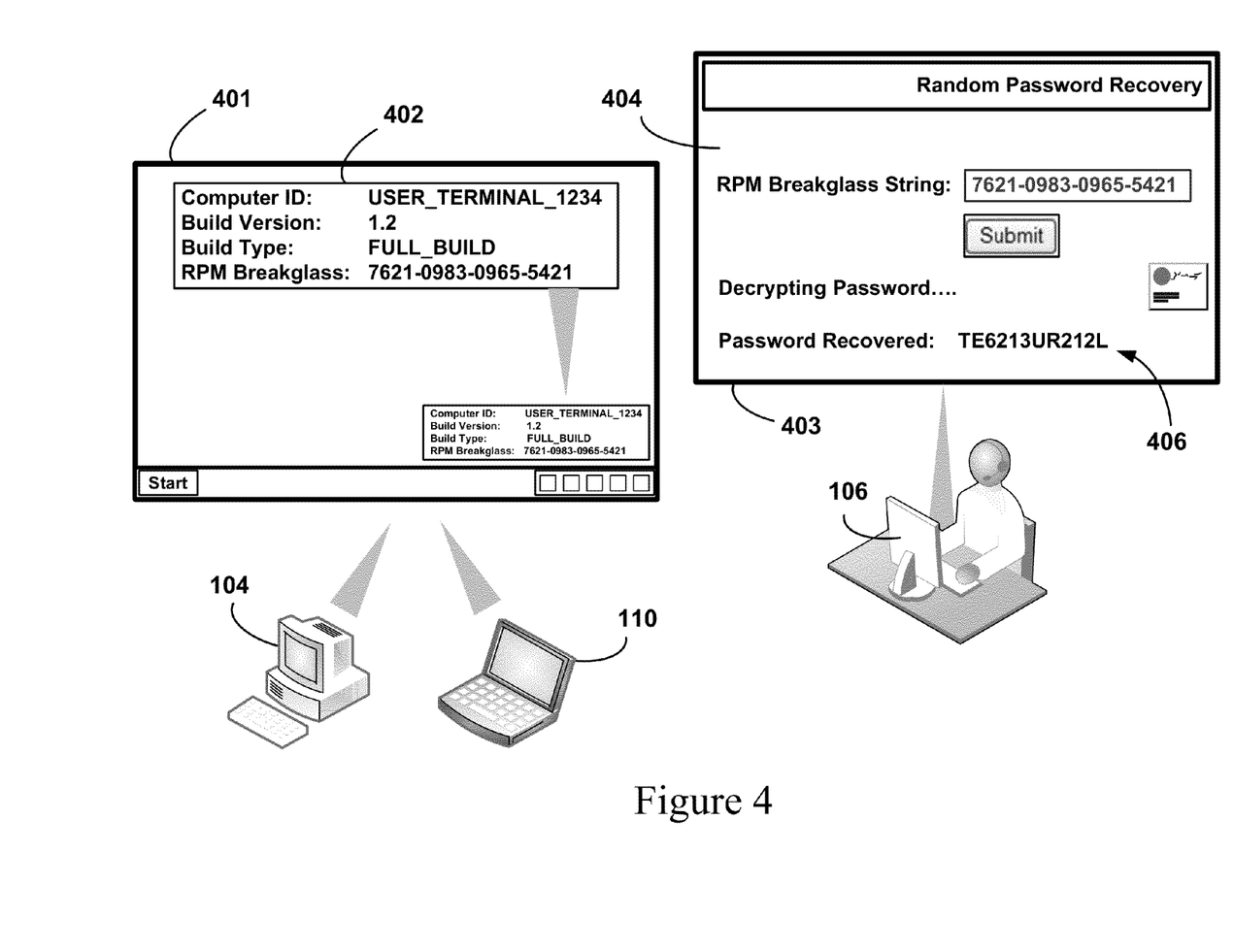
FIG. 4 illustrates exemplary display screens employing random password management consoles in accordance with an embodiment of the present invention.

Exemplary displays of a client RPM agent window 402 and an RPRS application console 404 for, respectively, client terminal 104 or mobile device 110 and controller terminal 106 are illustrated in FIG. 4. When a terminal 104 or a mobile device 110 is accessed by a user, RPM agent 105 may be configured to automatically create a new administrator-level password. Upon encryption of the newly created administrator-level password, as previously described in connection with process flow 200, a breakglass string is stored and displayed, as illustrated in application window 402 provided on a user screen 401.

When unrestricted access to terminal 104 or mobile device 110 is required, the breakglass string displayed in window 402 provided on user screen 401 is retrieved by an authorized user with access to console 404 provided on a user screen 403 of controller terminal 106. In an alternate embodiment, the breakglass string may be retrieved from RPM database server 112 maintaining an inventory of breakglass strings. Once the breakglass string is retrieved, RPRS application 107 may then be used to decrypt the breakglass string, as previously described in connection with process flow 300, and reveal the unique administrator-level password 406, as displayed on console 404. Having obtained the unique administrator-level password, unrestricted access to client terminal 104 or mobile device 110 can now be gained. As previously described, RPM agent 105 may then automatically generate a new administrator-level password for client terminal 104 or mobile device 110.

Thus, a system and method for actively managing and generating unique administrator-level passwords is provided. One skilled in the art will appreciate that the present invention can be practiced by other than the described embodiments, which are presented herein for purposes of illustration and not of limitation, and the present invention is limited only be the claims that follow.

We claim:

1. A system comprising:
   a user computer configured to:
   generate a random string of characters representative of a first administrator-level password, wherein said first administrator-level password is unique to said user computer,
   encrypt said first administrator-level password using a symmetric key, wherein said encrypted first administrator-level password generates a first breakglass string,
   store said first breakglass string in association with said user computer for which said encrypted first administrator-level password was created, and
   upon decryption of said first breakglass string, generate a second administrator-level password for encryption into a second breakglass string.

2. The system of claim 1, wherein said user computer is one of a hardware workstation terminal or a mobile device.

3. The system of claim 1, wherein the user computer is further configured to:

generate a public key and a private key associated with said user computer,
retrieve a server public key associated with said user computer, and
generate said symmetric key using said private key and said retrieved server public key.

4. A system comprising:
a controller computer configured to:
retrieve an encrypted first administrator-level password, wherein said encrypted administrator-level password is represented by a first breakglass string unique to a user computer,
decrypt said first breakglass string using a symmetric key, and
reveal said first administrator-level password for obtaining unrestricted access to said user computer, wherein upon decryption of said first administrator-level password, a second administrator-level password for encryption into a second breakglass string is generated.

5. The system of claim 4, wherein the controller computer is further configured to:
access a network database configured to store an encrypted administrator-level password for a plurality of network user computers, and
query said network database for said encrypted first administrator-level password corresponding to said user computer to which unrestricted access is desired.

6. The system of claim 4, wherein the controller computer is further configured to:
retrieve a unique system identifier for said secured network user computer,
derive a public key based on said first breakglass string,
retrieve a server private key associated with said user computer, and
generate said symmetric key using said derived public key and said retrieved server private key.

7. The system of claim 4, wherein upon use of said first administrator-level password for obtaining unrestricted access to said secured user computer, said first administrator-level password is rendered obsolete for future use.

8. The system of claim 4, wherein an activity corresponding to said encrypted first administrator-level password is logged to maintain an audit trail.

9. A system comprising:
a client terminal comprising a random password management agent configured to generate a random string of characters representative of a first administrator-level password, and encrypt said first administrator-level password using a shared symmetric key to generate a first breakglass string of characters;
a database server configured to connect to the client terminal and store said first breakglass string of characters in association with the client terminal; and
a controller computer comprising a random password recovery system application configured to retrieve said first breakglass string of characters and derive said symmetric key to decrypt said first breakglass string of characters and reveal said first administrator-level password, wherein upon decryption of said first administrator-level password, said random password management agent employed by said client terminal is configured to generate a second administrator-level password for encryption into a second breakglass string of characters and render said first administrator-level password obsolete.

10. A non-transitory computer-readable storage medium including instructions that, when executed by a computer, cause the computer to perform a method comprising:
generating a random string of characters representative of a first administrator-level password, wherein said first administrator-level password is unique to said user computer;
encrypting said first administrator-level password using a symmetric key, wherein said encrypted first administrator-level password generates a first breakglass string;
storing said first breakglass string in association with said user computer for which said encrypted first administrator-level password was created; and
upon decryption of said first breakglass string, generating a second administrator-level password for encryption into a second breakglass string of characters.

11. The non-transitory computer-readable storage medium of claim 10, wherein said user computer is one of a hardware workstation terminal or a mobile device.

12. The non-transitory computer-readable storage medium of claim 10, wherein encrypting said first administrator-level password using said symmetric key further comprises:
identifying said user computer for which said first administrator-level password was created;
generating a public key and a private key associated with said user computer;
retrieving a server public key associated with said user computer; and
generating said symmetric key using said private key and said retrieved server public key.

13. A non-transitory computer-readable storage medium including instructions that, when executed by a computer, cause the computer to perform a method comprising:
retrieving an encrypted first administrator-level password, wherein said encrypted administrator-level password is represented by a first breakglass string unique to a user computer;
decrypting said first breakglass string using a symmetric key; and
revealing said first administrator-level password for obtaining unrestricted access to said user computer, wherein upon decryption of said first administrator-level password, a second administrator-level password for encryption into a second breakglass string is generated.

14. The non-transitory computer-readable storage medium of claim 13, wherein retrieving said encrypted administrator-level password further comprises:
accessing a network database configured to store an encrypted administrator-level password for a plurality of user computers; and
querying said network database for said encrypted first administrator-level password corresponding to said user computer to which unrestricted access is desired.

15. The non-transitory computer-readable storage medium of claim 13, wherein decrypting said first breakglass string using said symmetric key further comprises the steps of:
retrieving a unique system identifier for said user computer;
deriving a public key, wherein said public key is derived from said first breakglass string;
retrieving a server private key associated with said user computer; and
generating said symmetric key using said derived public key and said retrieved server private key.

16. The non-transitory computer-readable storage medium of claim 13, wherein upon use of said first administrator-level password for obtaining unrestricted access to said user computer, said first administrator-level password is rendered obsolete for future use.

17. The non-transitory computer-readable storage medium of claim 13, wherein activities corresponding to said encrypted first administrator-level password are logged to maintain an audit trail.

\* \* \* \* \*